Sept. 27, 1932.  H. P. SWAIN  1,879,587
LEVEL AND PLUMB INDICATOR
Filed May 14, 1930   2 Sheets-Sheet 1

H. P. Swain, INVENTOR
BY Victor J. Evans
ATTORNEY

Sept. 27, 1932.  H. P. SWAIN  1,879,587
LEVEL AND PLUMB INDICATOR
Filed May 14, 1930   2 Sheets-Sheet 2

H. P. Swain, INVENTOR
BY Victor J. Evans
ATTORNEY

Patented Sept. 27, 1932

1,879,587

UNITED STATES PATENT OFFICE

HARRY P. SWAIN, OF CONCORD, NEW HAMPSHIRE

LEVEL AND PLUMB INDICATOR

Application filed May 14, 1930. Serial No. 452,485.

This invention relates to certain new and useful improvements in geometrical instruments and which embodies among other characteristics means whereby the calculation may be more accurately computed and read.

One of the principal objects of the invention consists of a plumb for the instrument.

Another object of the invention contemplates the provision and arrangement of pointer hands for the instrument designed to be shifted over the entire surface of the instrument.

More specifically stated the instrument is provided with dials graduated in such manner that the pointer hands may be registered therewith with more precision and with less eye strain.

With the above and other objects in view, the invention further consists of the following novel features and details of construction, to be hereinafter more fully described, illustrated in the accompanying drawings and pointed out in the appended claim.

Figure 1:
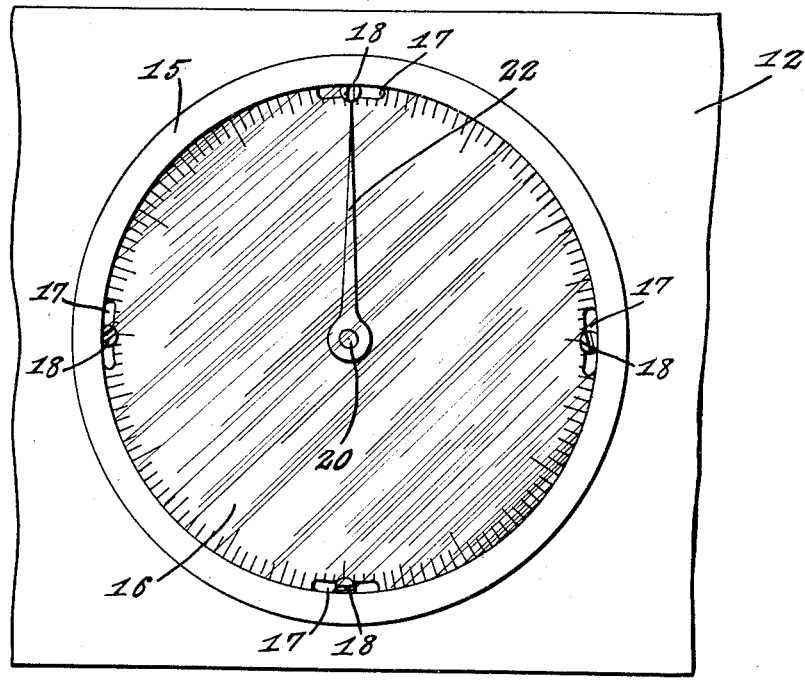
Figure 1 is a side elevation of the present invention as applied upon a portion of a level body.
Figure 2:
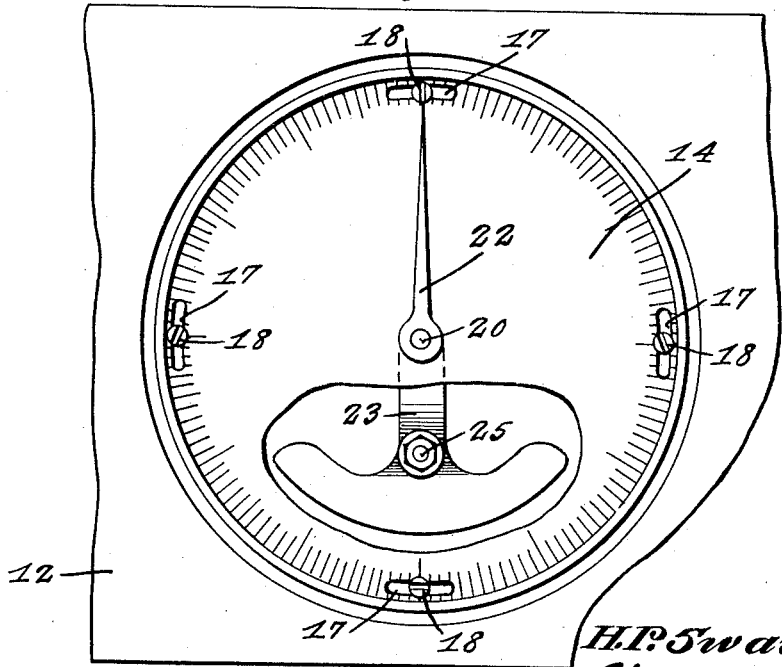
Figure 2 is a view similar to Figure 1 having one of the dials partly broken away to illustrate the arrangement of the plumb.
Figure 3:
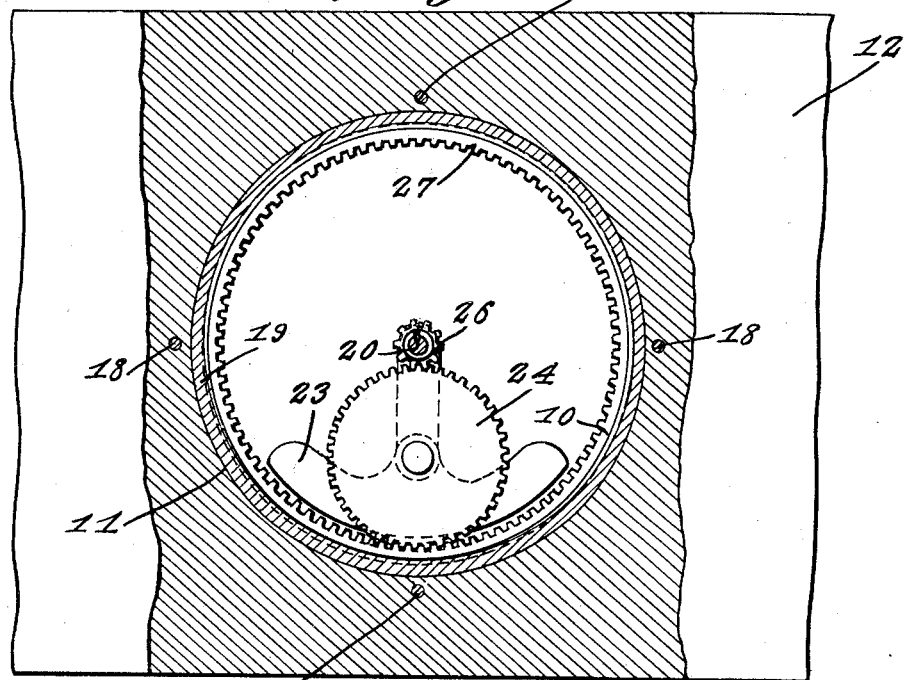
Figure 3 is a sectional view taken through the instrument on line 3—3 of Figure 4.

Referring to the drawings in detail wherein like characters of reference denote corresponding parts, the reference character 10 indicates generally an annular form of collar designed for disposition within an opening 11 in a beam 12; the latter may be constructed of wood or light metal. Recessed shoulder portions 13 arranged in the body of the beam upon opposite sides of and in communication with the opening 11 are designed to accommodate the bottom walls of cup-shaped closure plates 14 having the annular side walls thereof spaced for equal distances circumferentially thereof from the side walls of the recesses 13. Lens rims 15 of cross section angle shape projected within the aforementioned spaces and threadedly secured upon the side walls of the closure plates 14 retain lens members or sight plates 16 against the peripheral edges and side walls of the closure plates 14, the latter being calibrated with indicia commonly employed upon the dials for instruments of this character to indicate degrees of circles, percentages of grades and the like. The dials or closure plates 14 are provided with slots 17 at intervals thereon adjacent the peripheral edges thereof to accommodate fastening elements 18 adjustably secured within the body of the beam 12 whereby the respective dials may be set to correct any discrepancies or differences which may appear between the readings of the two dials.

Figure 4:
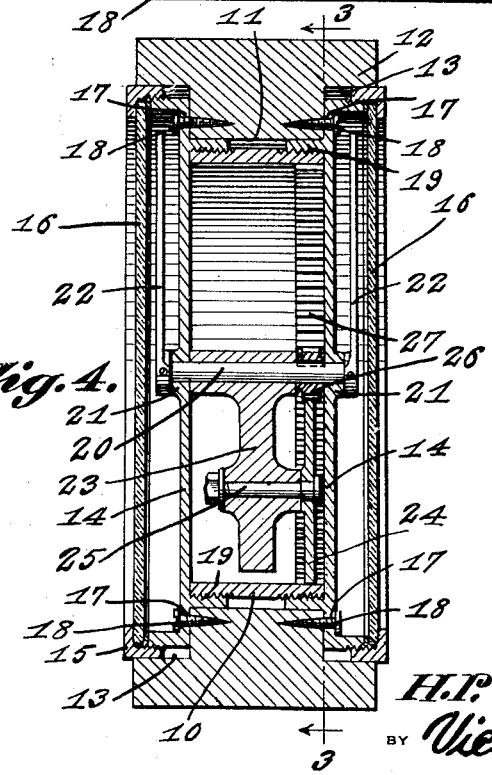
Figure 4 is a sectional view taken through the instrument at right angles to the arrangement disclosed in Figure 3.

Flange members 19 carried upon the inner sides of each of the closure plates or dials 14 are secured to the annular collar 10 in the manner suggested in Figure 4 of the drawings. A shaft member 20 journaled within bosses 21 disposed centrally of each of the closure plates or dials 14 and having pointer hands 22 fixed upon the outermost ends thereof, has swingably supported upon an appropriate portion of its length disposed between the respective dials 14, a plumb bob 23. A sleeve connection is provided for this purpose. A gear member 24 journaled upon a shaft member 25 carried by the plumb 23 is meshingly engaged with a gear member 26 fixed upon the shaft 20 and an annular gear 27 disposed upon the inner surface of the collar 10. By reason of the epicyclic gearing connection between the bob and the pointers, the latter will be swung in the same direction that they would if connected directly with the bob and, further, by reason of the ratios employed, the pointers will move a greater angular distance than if connected directly with the bob, thus providing for calibration of the dials with the indications for a given inclination spaced farther apart than would be necessary with direct connection between the pointers and the bob.

The invention is susceptible of various changes in its form, proportions and minor details of construction, and the right is herein reserved to make such changes as properly fall within the scope of the appended claim.

Having described the invention, what is claimed is:

A level comprising a beam having an opening passing transversely therethrough and having recesses at its opposite sides surrounding said opening, a housing concentrically arranged within the opening and provided at its inner surface with a set of gear teeth, dial plates closing the ends of the housing and bearing upon the inner walls of the recesses, said dial plates having peripheral slots, screws passing through the slots and entering the beam, a shaft journaled at the centers of the dial plates, indicator fingers carried at the ends of the shaft and disposed over the outer surfaces of the dial plates, a plumb member loosely mounted upon the shaft, a gear wheel journaled upon the plumb member and meshing with the teeth of the housing, a gear wheel fixed to the shaft and meshing with the teeth of the first mentioned gear wheel and transparencies disposed over the outer surfaces of the dial plates.

In testimony whereof I affix my signature.

HARRY P. SWAIN.